United States Patent
Shim et al.

(10) Patent No.: US 10,592,034 B2
(45) Date of Patent: Mar. 17, 2020

(54) MOBILE TERMINAL AND METHOD FOR CONTROLLING THE SAME

(71) Applicant: LG ELECTRONICS INC., Seoul (KR)

(72) Inventors: Hongjo Shim, Seoul (KR); Sungho Woo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 123 days.

(21) Appl. No.: 15/682,280

(22) Filed: Aug. 21, 2017

(65) Prior Publication Data

US 2018/0224990 A1    Aug. 9, 2018

(30) Foreign Application Priority Data

Feb. 3, 2017   (KR) .................. 10-2017-0015626

(51) Int. Cl.
| | |
|---|---|
| *G06F 3/041* | (2006.01) |
| *G06F 1/16* | (2006.01) |
| *G06F 3/0484* | (2013.01) |
| *G06F 3/0488* | (2013.01) |
| *G06F 3/01* | (2006.01) |

(52) U.S. Cl.
CPC .......... *G06F 3/0414* (2013.01); *G06F 1/1626* (2013.01); *G06F 1/1643* (2013.01); *G06F 1/1671* (2013.01); *G06F 3/016* (2013.01); *G06F 3/0412* (2013.01); *G06F 3/0484* (2013.01); *G06F 3/04886* (2013.01); *G06F 2203/04102* (2013.01); *G06F 2203/04105* (2013.01)

(58) Field of Classification Search
CPC ....... G06F 3/0414; G06F 3/016; G06F 3/0488
See application file for complete search history.

(56) References Cited

U.S. PATENT DOCUMENTS

| | | | |
|---|---|---|---|
| 2002/0033795 A1* | 3/2002 | Shahoian | ............ G06F 1/1616 345/156 |
| 2006/0132455 A1* | 6/2006 | Rimas-Ribikauskas | ................... G06F 3/0414 345/173 |

(Continued)

FOREIGN PATENT DOCUMENTS

WO    2017018680    2/2017

OTHER PUBLICATIONS

PCT International Application No. PCT/KR2017/009040, Notification of Transmittal of the International Search Report and the Written Opinion of the International Searching Authority, or Declaration dated Dec. 14, 2017, 13 pages.

*Primary Examiner* — Sepehr Azari
(74) *Attorney, Agent, or Firm* — Lee Hong Degerman Kang & Waimey

(57) ABSTRACT

A mobile terminal includes: a display unit for outputting an image and receiving a touch input; a virtual home key unit overlapped with a specific region of the display unit, and for generating a control command for executing a specific function; and a controller for forming the control command, wherein the virtual home key unit includes: a vibration output unit for outputting vibrations of a specific pattern based on a touch input applied to the specific region and a peripheral region; and a pressure sensor disposed between the vibration output unit and the display unit, and for sensing a touch pressure, and wherein the controller executes the specific function when the touch pressure is sensed.

16 Claims, 17 Drawing Sheets

(56) References Cited

U.S. PATENT DOCUMENTS

| | | | |
|---|---|---|---|
| 2009/0195515 A1* | 8/2009 | Lee | G06F 3/04817 345/173 |
| 2013/0063380 A1 | 3/2013 | Wang et al. | |
| 2013/0076649 A1 | 3/2013 | Myers et al. | |
| 2014/0006994 A1 | 1/2014 | Koch et al. | |
| 2014/0145994 A1 | 5/2014 | Burrough et al. | |
| 2014/0292699 A1* | 10/2014 | Ando | G06F 3/0414 345/173 |
| 2015/0022459 A1* | 1/2015 | Yliaho | G06F 3/0414 345/173 |
| 2018/0081441 A1* | 3/2018 | Pedder | G06F 3/016 |

* cited by examiner

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2017-0015626, filed on Feb. 3, 2017, the contents of which are incorporated by reference herein in its entirety.

TECHNICAL FIELD

The present invention relates to a mobile terminal capable of forming a home key on a display unit.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Efforts are ongoing to support and increase the functionality of mobile terminals. Such efforts include software and hardware improvements, as well as changes and improvements in the structural components.

Recently, research to minimize a size of a bezel portion on a mobile terminal is ongoing, and a structure to install no home key on the bezel portion is being realized. In case of outputting an image corresponding to the home key to a display unit, a utilizable space on the display unit may be reduced, or screen information may be blocked.

DISCLOSURE OF THE INVENTION

Therefore, an object of the present invention is to provide a mobile terminal which needs not arrange a home key unit on a bezel portion and a display unit.

To achieve these and other advantages and in accordance with the purpose of the present invention, as embodied and broadly described herein, there is provided a mobile terminal, comprising: a display unit for outputting an image and receiving a touch input; a virtual home key unit overlapped with a specific region of the display unit, and for generating a control command for executing a specific function; and a controller for forming the control command, wherein the virtual home key unit includes: a vibration output unit for outputting vibrations of a specific pattern based on a touch input applied to the specific region and a peripheral region; and a pressure sensor disposed between the vibration output unit and the display unit, and for sensing a touch pressure, and wherein the controller executes the specific function when the touch pressure is sensed.

In an embodiment, the vibration output unit outputs vibrations of a different pattern according to whether the touch input is applied to the peripheral region or the specific region. This may allow a user to recognize a position of the virtual home key unit in a tactile manner.

In an embodiment, the controller compares a pressure touch application time with a reference time to determine a general touch input or a long touch input, the pressure touch application time corresponding to a time duration from a time when the touch pressure is larger than the reference pressure to a time when the touch pressure becomes smaller than or equal to the reference pressure. And the controller performs a different function based on the general touch input or the long touch input. With such a configuration, various functions may be set to one virtual home key unit.

In an embodiment, the mobile terminal may include a plurality of virtual home key units overlapped with the display unit. This may allow a control command to be input, by activating the virtual home key units on various positions according to an occurred event and an executed application.

In the present invention, since an additional structure such as a pressing key needs not be arranged at a bezel portion, a size of the bezel portion may be minimized. Further, since a virtual home key image needs not be output to the display unit, screen information may be output in an extended state to the maximum.

Since the vibration output unit outputs vibrations of a different pattern according to a position where a touch input is applied, a user may sense a position of his or her finger and a position of the virtual home key unit.

Further, the controller may perform a control by distinguishing a general touch input and a long touch input from each other, by measuring a time duration for which a pressure touch is applied.

Further, since a control command is applied regardless of an output state of screen information to the display unit, a user may execute a desired function only in a tactile manner.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, a digital signage and the like.

Figure 1A:
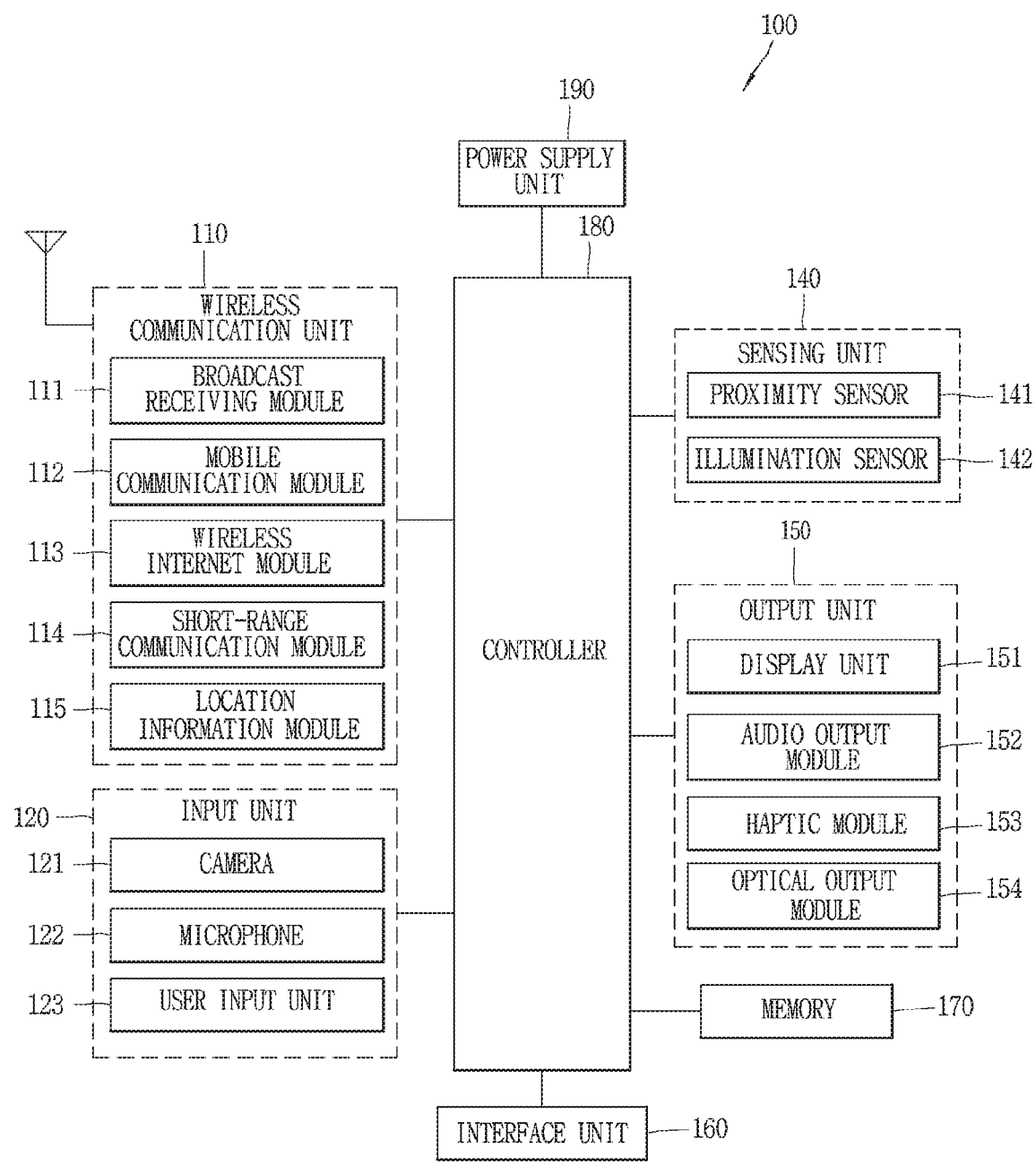
FIG. 1A is a block diagram for explaining a mobile terminal according to the present invention.

FIG. 1A is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components shown in FIG. 1A is not a requirement, and that greater or fewer components may alternatively be implemented.

The mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from at least two sensors of the sensing unit, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components, or activating application programs stored in the memory 170.

Further, the controller 180 controls some or all of the components shown in FIG. 1A in order to drive application programs stored in the memory 170. Further, in order to drive the application programs, the controller 180 may operate at least two of the components included in the mobile terminal 100 in a combined manner.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of the mobile terminal according to various embodiments to be explained later. The operation or the control method of the mobile terminal may be implemented on the mobile terminal by driving at least one application program stored in the memory 170.

Hereinafter, the above components will be explained in more detail with reference to FIG. 1A before various embodiments implemented through the aforementioned mobile terminal 100 are explained.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal 100 may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 1B:
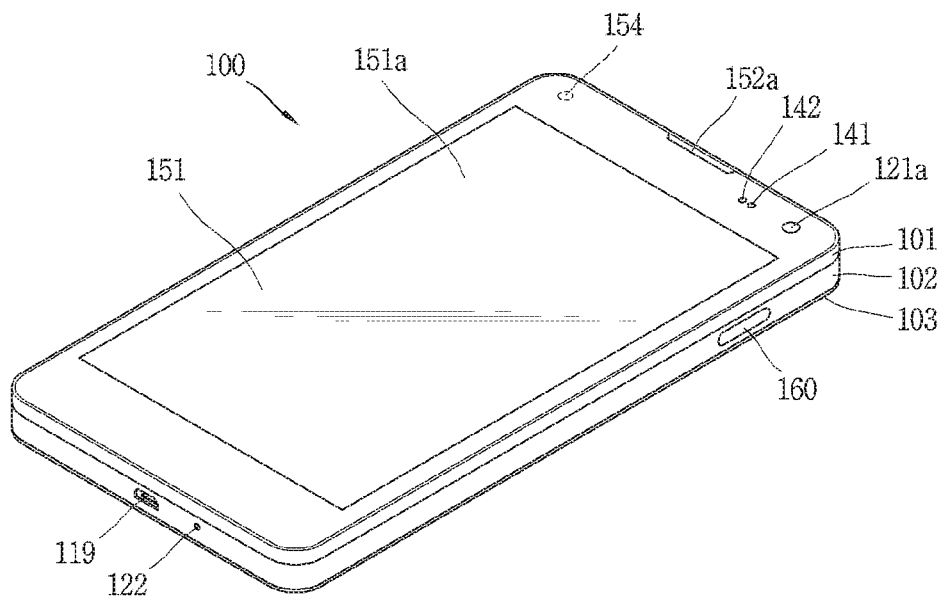
FIGS. 1B and 1C are conceptual views of a mobile terminal according to an embodiment of the present invention, which are viewed from different directions.
Figure 1C:
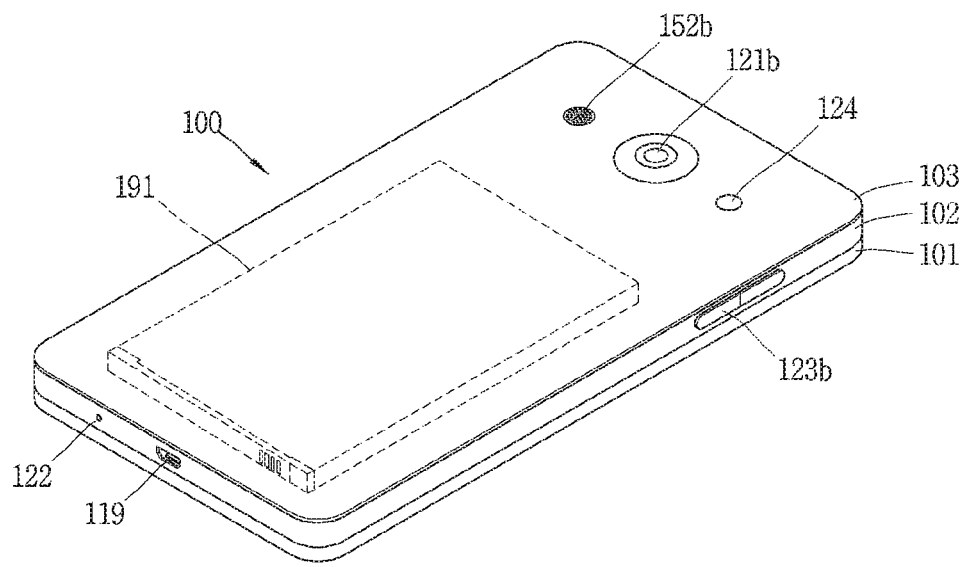

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to indicate the mobile terminal 100 regarded as at least one integrated body.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first and second audio output modules 152a,152b, the proximity sensor 141, the illumination sensor 142, the optical output unit 154, the first and second cameras 121a, 121b, the first and second manipulation units 123a, 123b, the microphone 122, the interface unit 160, etc.

As shown in FIGS. 1B and 1C, the mobile terminal 100 will be explained under an assumption that the display unit 151, the first audio output module 152a, the proximity sensor 141, the illumination sensor 142, the optical output unit 154, the first camera 121a, and the first manipulation unit 123a are located on a front surface of the terminal body, the second manipulation unit 123b, the microphone 122 and the interface unit 160 are located on a side surface of the terminal body, and the second audio output module 152b and the second camera 121b are located on a rear surface of the terminal body.

However, it is to be understood that alternative arrangements are possible and within the teachings of the instant disclosure. Some components may be omitted or rearranged. For example, the first manipulation unit 123a may not be located on the front surface of the terminal body, and the second audio output module 152b may be located on the side surface of the terminal body rather than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

The drawing illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 (refer to FIG. 1A) for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the mobile terminal 100 according to the present invention, a user input unit for applying a control command to output a home screen page is not formed at a bezel portion which encloses the display unit 151.

Here, the home screen page corresponds to screen information including icons for executing applications, widgets which display specific information according to a user's setting, etc. If the control command is applied while an execution screen of an application is being output, the execution screen is converted into the home screen page. If the home screen page is composed of a plurality of pages, a single page determined by a user's setting may be output based on the control command.

Accordingly, the control command to output the home screen page is formed by a touch input (or a pressure touch) applied onto the display unit. In an embodiment of the present invention, if a touch input is applied to at least one region of the display unit, vibrations may be output, and the control command may be generated as a touch pressure is sensed. This may allow a control command which performs a specific function to be generated, even if a user input unit is not formed on the bezel portion.

Further, since a user can sense a specific region on the display unit by sensing vibrations with his or her finger, a visual graphic image for forming a specific control command needs not be output to the display unit.

With such a configuration, a bezel portion may be minimized, and an output region of screen information on the display unit may be maximized. Hereinafter, a structure for sensing a touch, sensing a pressure and outputting vibrations according to the present invention will be explained in more detail.

Figure 2A:
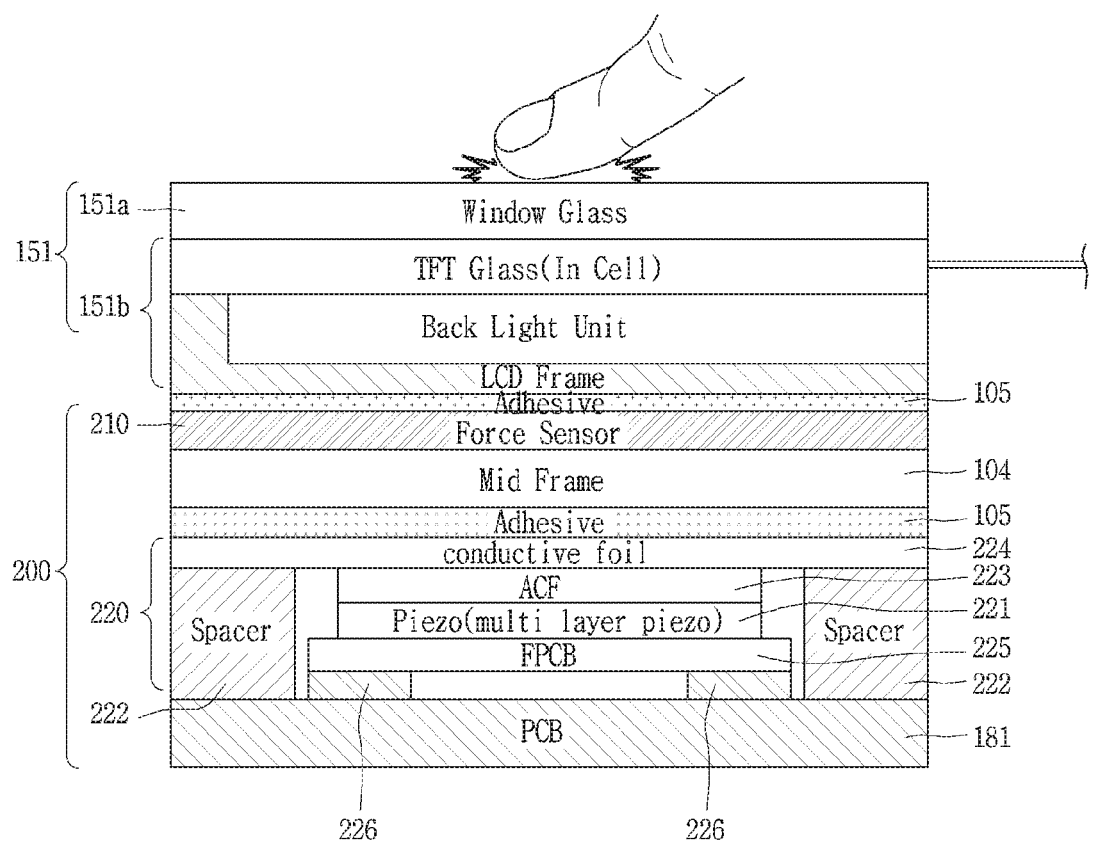
FIG. 2A is a conceptual view for explaining a display unit, a pressure sensor and a vibration output unit according to an embodiment of the present invention.
Figure 2B:
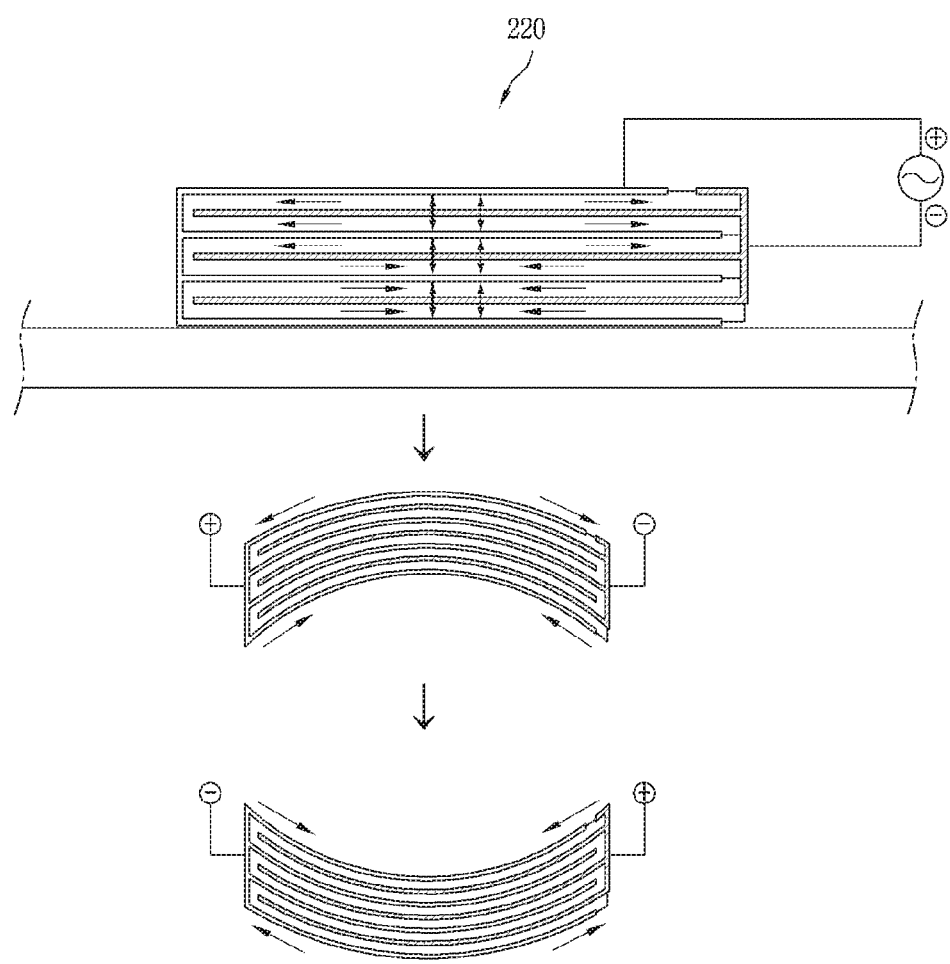
FIG. 2B is a conceptual view for explaining a driving method of the vibration output unit.

FIG. 2A is a conceptual view for explaining a display unit, a pressure sensor and a vibration output unit according to an embodiment of the present invention, and FIG. 2B is a conceptual view for explaining a driving method of the vibration output unit.

Referring to FIG. 2A, the mobile terminal 100 includes the display unit 151, a pressure sensor 210 and a vibration output unit 220. A virtual home key unit 200 including the pressure sensor 210 and the vibration output unit 220 is formed to be overlapped with a specific region of the display unit 151. The specific region may correspond to a region adjacent to the edge of the display unit 151, but the present invention is not limited to this.

The controller 180 generates a control command to output the home screen page, based on a touch input (and/or a pressure touch) applied onto the display unit 151 overlapped with the virtual home key unit 200.

The display unit 151 includes a window 151a exposed to the outside and forming the appearance of the mobile terminal 100, and a display module 151b which outputs an image. The display module 151b may be formed as an LCD module, but the present invention is not limited to this.

The pressure sensor 210 is formed to be overlapped with the specific region of the display module 151b. The pressure sensor 210 is attached to the display module 151b by an adhesive member 105.

The pressure sensor 210 senses a pressure while a touch input (a pressure touch) is being applied onto the window 151a. More specifically, when the touch input (the pressure touch) is applied, the window 151a and the display module 151b are bent by an external force, and the pressure sensor 210 senses a touch pressure.

The pressure sensor 210 is supported by an inner frame 104 which supports inner components of the mobile terminal 100. The vibration output unit 220 is attached to the inner frame 104 by the adhesive member 105, so as to be overlapped with the pressure sensor 210. The vibration output unit 220 includes a piezo layer 221, spacers 222, a conductive film 223, a conductive layer 224, a flexible printed circuit board 225, and electrodes 226.

The piezo layer 221 is disposed between the pair of spacers 222 spaced from each other. The pair of spacers 222 form a space by supporting between the inner frame 104 and a main printed circuit board 181. The piezo layer 221 is disposed at the space.

The piezo layer 221 is formed between the conductive film 223 (ACF) formed on the conductive layer 224, and the flexible printed circuit board 225. And the flexible printed circuit board 225 is electrically connected to the main printed circuit board 181 through a plurality of electrodes 226.

The piezo layer 221 is formed of a piezoelectric material using at least one of artificial ceramic (PZT), crystal, Rochelle salt, and barium titanate (BaTio3). The piezoelectric effect is a principle to generate a potential difference (a voltage) when a pressure is applied, or a principle to generate a physical displacement when a potential difference (a voltage) is applied.

Referring to FIG. 2B, the piezo layer 221 is connected to a circuit such that a voltage is applied to a material which generates a piezoelectric effect. The piezo layer 221 may be formed of piezo ceramic having a plurality of layers. Once an alternating current voltage is supplied to the piezo layer 221 disposed at a space formed by the pair of spacers 222, the piezo layer 221 is contracted and expanded repeatedly. As the piezo layer 221 is transformed, vibrations are output.

In this embodiment, the pressure sensor 210 and the vibration output unit 220 are disposed to be overlapped with each other. When a touch input is sensed on a specific region on the display unit 151 where the pressure sensor 210 and the vibration output unit 220 are disposed, the controller 180 may control the vibration output unit 210 to output vibrations. Then, the controller 180 may check, through the pressure sensor 220, whether a pressure is sensed by a pressure touch applied to the specific region, and then may generate a preset control command (a control command to output a home screen page).

Figure 3:
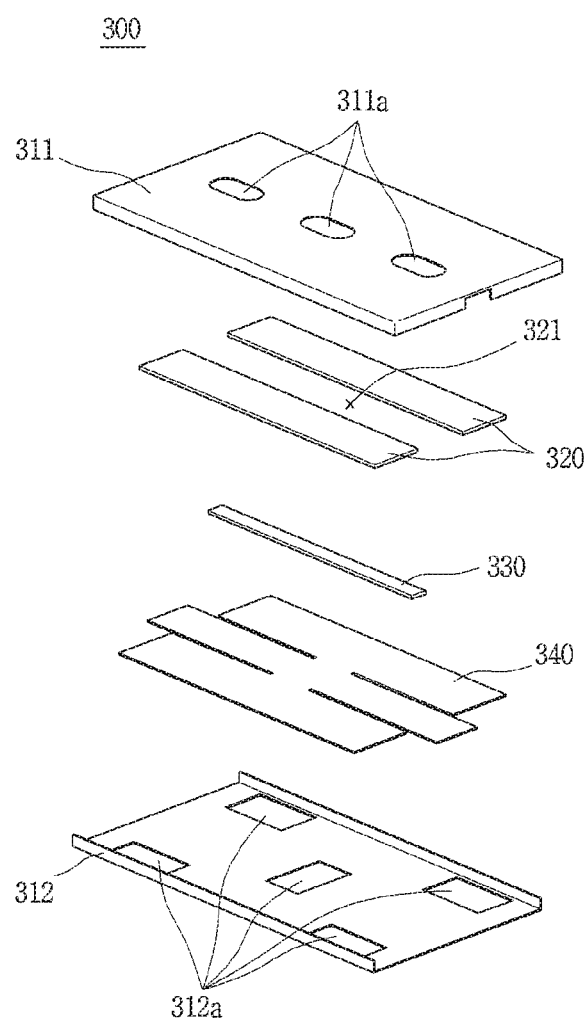
FIG. 3 is a disassembled perspective view for explaining an integrated type virtual home key unit according to another embodiment of the present invention.

FIG. 3 is a disassembled perspective view for explaining an integrated type virtual home key unit according to another embodiment of the present invention.

The integrated type virtual home key unit according to another embodiment of the present invention is formed as a single module.

The integrated type virtual home key unit includes first and second cases 311, 312, a pressure sensor 320, a piezo layer 330, and a flexible printed circuit board 340.

The pressure sensor 320, the piezo layer 330, and the flexible printed circuit board 340 are arranged at a space formed by the first and second cases 311, 312. The pressure sensor 320 includes first and second sensing members arranged to form a separating space 321 therebetween. The piezo layer 330 is disposed between the first and second sensing members (i.e., at the separating space 321). The flexible printed circuit board 340 electrically connected to the piezo layer 330 is disposed below the pressure sensor 320 and the piezo layer 330.

The first and second cases 311, 312 include a plurality of first and second holes 311a, 312, respectively. The first holes 311a of the first case 311 are formed to be overlapped with the piezo layer 330. The piezo layer 330 may protrude to the first holes 311a through its transformation, or may partially/temporarily protrude to the outside of the integrated type virtual home key unit 300. Through the second holes 312a, the flexible printed circuit board 340 and the main printed circuit board may be electrically connected to each other.

The integrated type virtual home key unit 300 may be disposed to be overlapped with a specific region on the display unit 151.

Figure 4A:
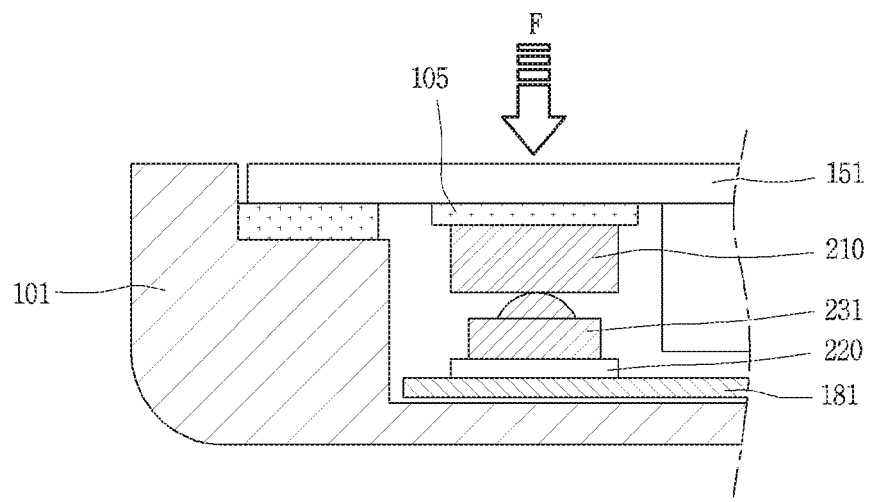
FIGS. 4A and 4B are conceptual views for explaining a virtual home key unit according to another embodiment of the present invention.
Figure 4B:
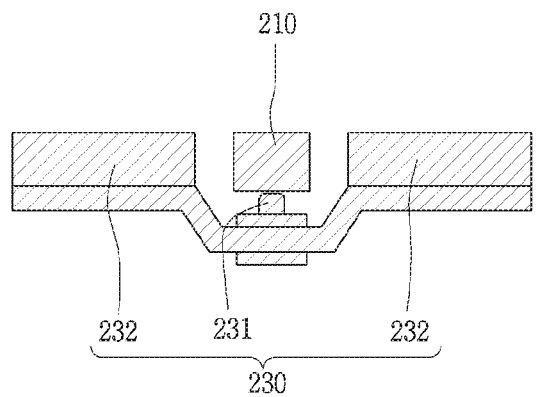

FIGS. 4A and 4B are conceptual views for explaining a virtual home key unit according to another embodiment of the present invention.

The pressure sensor 210 of the virtual home key unit 200 shown in FIGS. 4A and 4B is supported by an actuator 230. The pressure sensor 210 is disposed above the actuator 230, and the piezo layer 220 is attached below the actuator 230. The virtual home key unit 200 according to this embodiment is the same as the virtual home key unit 200 shown in FIGS. 2A and 2B, except for the actuator 230. Thus, the same or similar components will be provided with the same reference numerals, and explanations thereof will be omitted. The pressure sensor 210 may be formed as a pressure sensor chip.

The actuator 230 includes a supporting portion 231 which supports the pressure sensor 210, and an attachment portion 232 extending from the supporting portion 231 and fixed to the display unit 151. One surface of the supporting portion 231 which supports the pressure sensor 210 is protruded. Thus, a pressure transmitted through the display unit 151 may be transferred to the pressure sensor 210 more efficiently.

An adhesive member 105 is formed between the supporting portion 231 and the display unit 151. The supporting portion 231 is formed in a state that the pressure sensor 210 is interposed between the supporting portion 231 and the display unit 151. Thus, the actuator 230 supports the pressure sensor 210 pressed by an external force, in a fixed state to the display unit 151.

The inner frame 104 and the vibration output unit 220 attached to the inner frame 104 are disposed below the actuator 230. Since the inner frame 104 and the vibration output unit 220 are attached to another surface of the actuator 230 opposite to the one surface of the actuator 230, vibrations may be efficiently transferred up to one region of the display unit 151.

In these embodiments, the virtual home key units 200, 300 are disposed to be overlapped with a specific region of the display unit 151. The virtual home key units 200, 300 output vibrations to the specific region, and sense a touch pressure applied to the specific region. Accordingly, a user may sense whether his or her finger has touched a specific region through output vibrations, and may perform a preset function by applying a touch pressure to the specific region.

Thus, a visual graphic image for recognizing a specific region corresponding to the preset function needs not be output, or a user input unit (a physical key) which can be pressed needs not be additionally disposed at the bezel portion.

Hereinafter, a control method for performing a specific function by the virtual home key units 200, 300 according to the present invention will be explained.

Figure 5A:
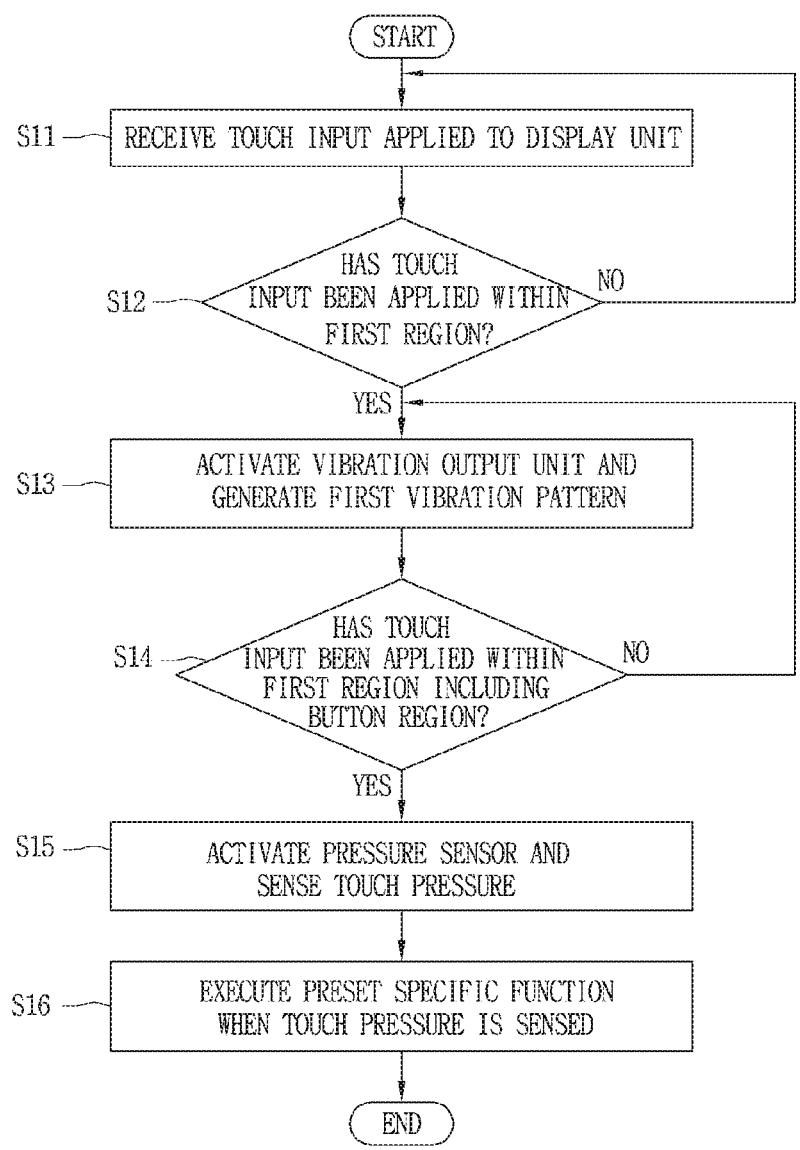
FIG. 5A is a flowchart for explaining a method for controlling a mobile terminal according to an embodiment of the present invention.
Figure 5B:
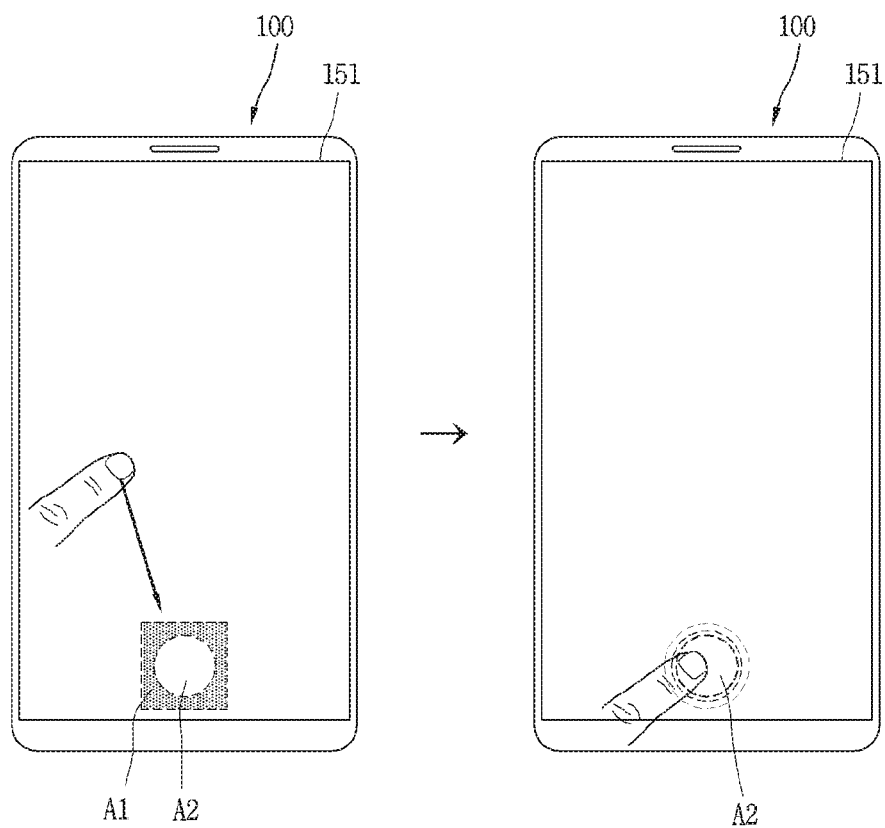
FIG. 5B is a conceptual view for explaining the control method of FIG. 5A.

FIG. 5A is a flowchart for explaining a method for controlling a mobile terminal according to an embodiment of the present invention, and FIG. 5B is a conceptual view for explaining the control method of FIG. 5A.

Referring to FIGS. 2A to 4B and FIGS. 5A and 5B, the mobile terminal according to this embodiment includes a pressure sensor 210 and a vibration output unit 220. A touch pressure applied onto the display unit 151 may be sensed by the pressure sensor 210, and vibrations output by the vibration output unit 220 may be transmitted to one region of the display unit 151 to thus be recognized by a user's finger.

Referring to FIGS. 5A and 5B, the display unit 151 (or the touch sensor included in the display unit 151) receives a touch input applied to the window 151a of the display unit 151 (S11).

Once the touch input is applied, the controller 180 senses touch coordinates, and determines whether the touch input corresponds to a first region (A1) or not (S12). The memory 170 stores therein coordinates information of a specific region of the display unit 151 overlapped with the virtual home key unit. The controller 180 compares coordinates information of the first region (A1) with the coordinates information of the touch input.

If the coordinates of the touch input are not positioned within the first region (A1), the controller 180 may perform a function corresponding to the touch coordinates or ignore the touch input.

On the other hand, if the coordinates of the touch input are positioned within the first region (A1), the controller 180 controls the vibration output units 220, 320 to output a first vibration pattern.

Referring to FIG. 5B, the first region (A1) is defined as a region which encloses a second region (A2). The controller 180 forms a specific control command by applying a pressure touch to the second region (A2), and does not form the control command even if a pressure touch is applied to the first region (A1). That is, the first region (A1) corresponds to a peripheral region of the second region (A2), and is defined as a quadrangular region in the drawings. However, the present invention is not limited to this. A region spaced from the second region (A2) by a predetermined length may be defined as the first region (A1).

When a touch input is applied to the first region (A1) including a button region (S14), the controller 180 activates the pressure sensors 210, 310 to sense a touch pressure.

If a touch pressure is sensed, the controller 180 executes a preset specific function (S16). Here, the touch pressure corresponds to a pressure having more than a reference value, the pressure sensed by the pressure sensors 210, 310. And the specific function may correspond to a control command to activate the display unit 151, or a control command to output a home screen page. However, the present invention is not limited to this.

If no touch pressure is sensed, the controller 180 may perform a function corresponding to a graphic image output to a region on the display unit 151 corresponding to the second region. With such a configuration, when a touch pressure is sensed on the second region in an output state of screen information including a plurality of images, a preset specific application is executed. On the other hand, if a touch input is applied in a state that a touch pressure has not been sensed, a function corresponding to a touched image is executed.

When the second region (A2) out of the first region (A1) is touched, the controller 180 may control the vibration output units 220, 320 to output a second vibration pattern different from the first vibration pattern. In this case, a user may sense that he or she has moved to a region including a button region.

In a deactivated state of the display unit 180 that no image is output, if a touch pressure is applied to the second region (A2), the controller 180 may activate the display unit and may execute a function based on the control command. In this case, the touch sensor included in the display unit 180 may have its one or more regions maintain an activated state.

For instance, in a deactivated state of the display unit 180, if a touch input is applied to the first region (A1) or the second region (A2), the controller 180 controls the vibration output units to output vibrations of a specific pattern. If a touch pressure of a pressure touch applied to the second region (A2) is sensed, the controller 180 may activate the display unit 151 to output the home screen page.

Figure 5C:
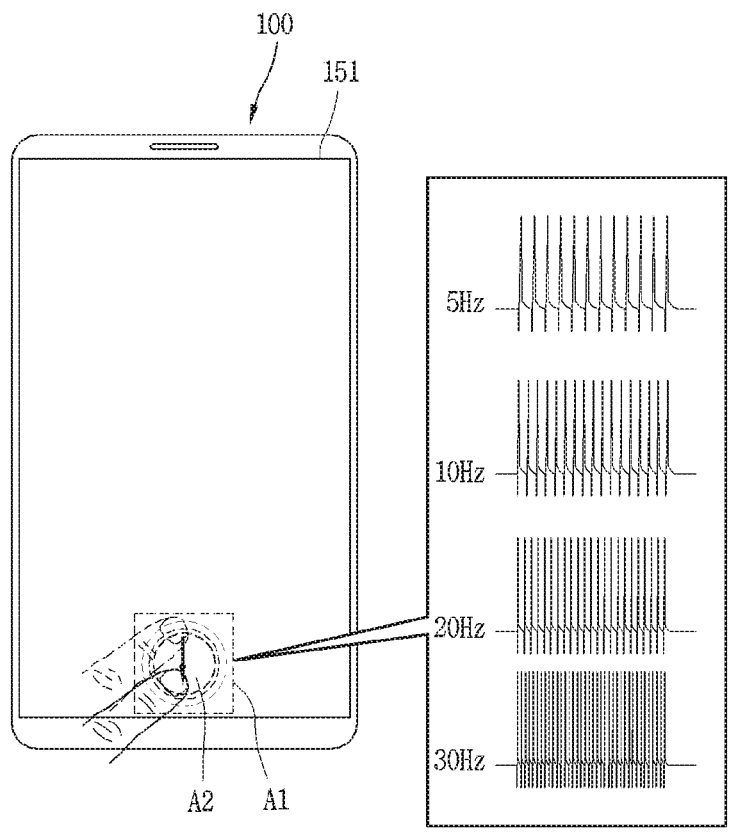
FIG. 5C is a conceptual view for explaining a method for controlling a mobile terminal according to another embodiment of the present invention.

FIG. 5C is a conceptual view for explaining a method for controlling a mobile terminal according to another embodiment of the present invention.

Components shown in FIG. 5C include at least one of the embodiments of FIGS. 2A to 4B.

The controller 180 controls the vibration output units 210, 310 to output a vibration pattern which changes continuously as a user enters the second region (A2) including a button region. For instance, the vibration output units 210, 310 may output vibrations having a lower frequency or a larger amplitude at a region farther from the second region (A2). Thus, a user may sense that his or her finger is approaching the button region. That is, as the user is close to the second region (A2), the user may be provided with a strong and disconnected feedback. The user may sense vibrations having a higher frequency and a smaller amplitude at a region closer to the second region (A2).

Figure 5D:
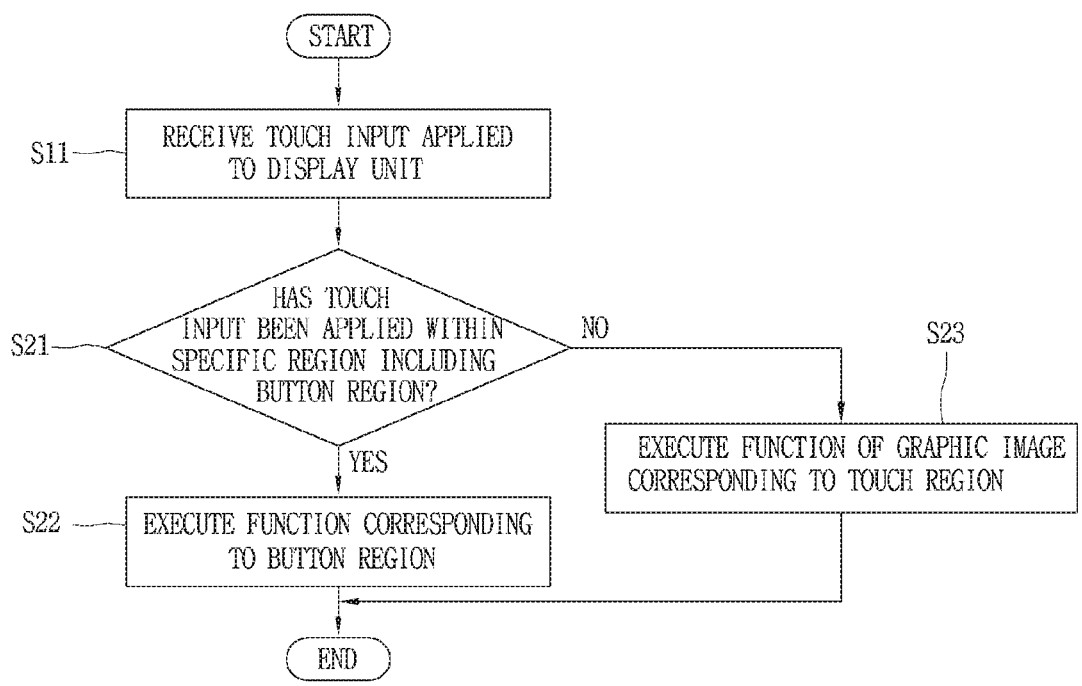
FIG. 5D is a conceptual view for explaining a method for controlling a mobile terminal according to another embodiment of the present invention.

FIG. 5D is a conceptual view for explaining a method for controlling a mobile terminal according to another embodiment of the present invention.

Referring to FIGS. 2A to 4B and FIG. 5D, a virtual home key unit according to this embodiment includes a pressure sensor 210 and a vibration output unit 220. A touch pressure applied onto the display unit 151 may be sensed by the pressure sensor 210, and vibrations output by the vibration output unit 220 may be transmitted to one region of the display unit 151 to thus be recognized by a user's finger.

The controller receives a touch input applied onto the display unit 151 (S11). Then, the controller determines whether the touch input is within a specific region including the button region (S21). Then, the controller 180 compares coordinates of the touch input sensed by the touch sensor of the display unit 151, with coordinates of a preset specific region.

If the touch input is applied within the specific region, the controller 180 performs a function corresponding to the button region (S22). On the other hand, if the touch input is applied to a region out of the specific region, the controller 180 performs a function of a graphic image corresponding to the region of the touch input (S23).

In this embodiment, when a touch input is applied within the specific region, the controller may control the vibration output units 220, 320 to output vibrations of a preset pattern.

In this embodiment, the controller 180 may perform a preset function when a touch input is applied to a specific region without a pressure.

Figure 6A:
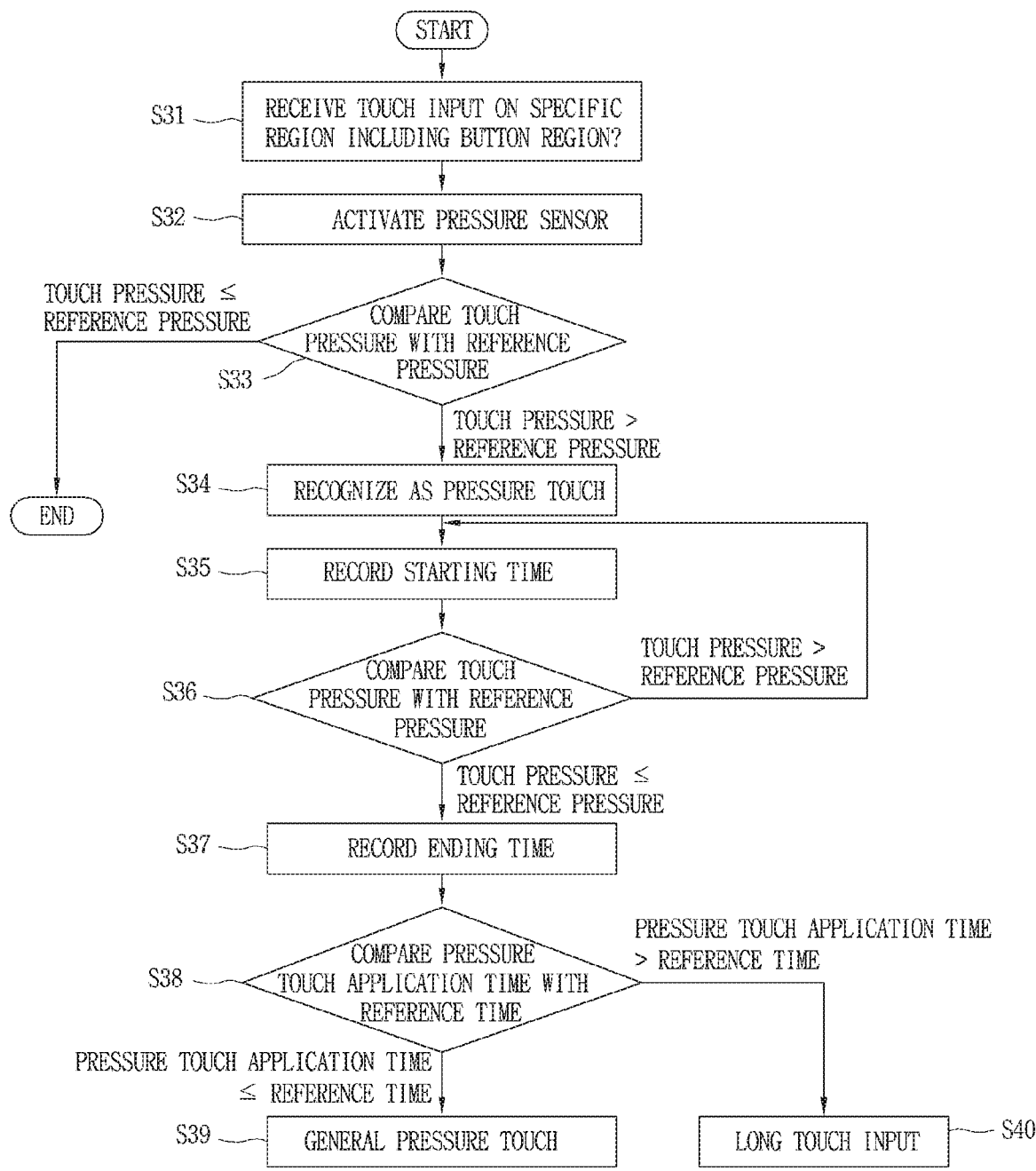
FIGS. 6A and 6B are conceptual views for explaining a control method to distinguish touch methods from each other.
Figure 6B:
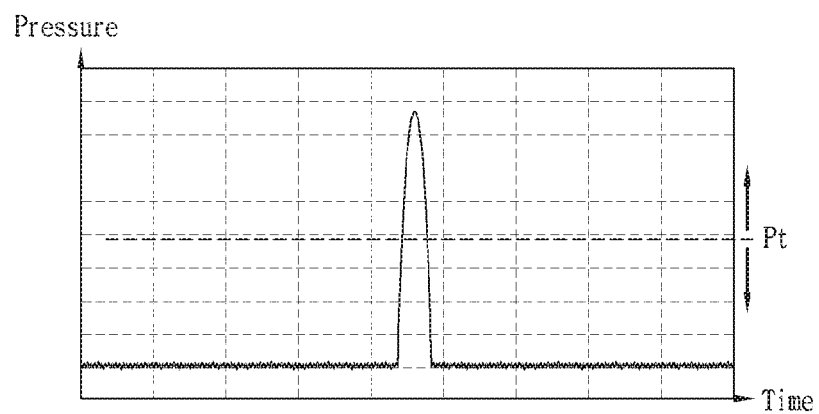

FIGS. 6A and 6B are conceptual views for explaining a control method to distinguish touch methods from each other.

Referring to FIG. 6A, if a touch input applied to a specific region including a button region is received (S31), the controller 180 activates the pressure sensors 210, 310 (S32).

The controller 180 compares a touch pressure sensed by the pressure sensors 210, 310 with a reference pressure (Pt)

(S33). If the touch pressure is less than or equal to the reference pressure (Pt), the controller 180 does not generate a control command.

On the other hand, if the touch pressure is larger than the reference pressure (Pt), the controller 180 recognizes the input as a pressure touch (S34). The controller 180 records a starting time when the input is recognized as the pressure touch, and records an ending time when the touch pressure becomes smaller than or equal to the reference pressure (Pt) (S35, S36, S37).

The controller 180 compares a pressure touch application time with a reference time, based on a difference between the starting time and the ending time (S38).

If the pressure touch application time is less than or equal to the reference time, the controller determines the pressure touch as a general pressure touch (S39). On the other hand, if the pressure touch application time is more than the reference time, the controller determines the pressure touch as a long touch input (S40). First and second control commands for executing different functions may be generated according to the general pressure touch and the long touch input.

With such a configuration, in case of executing a function according to a sensed touch pressure, a different touch input may be recognized based on a difference between pressure touch application times, and a different function may be executed.

Figure 7:
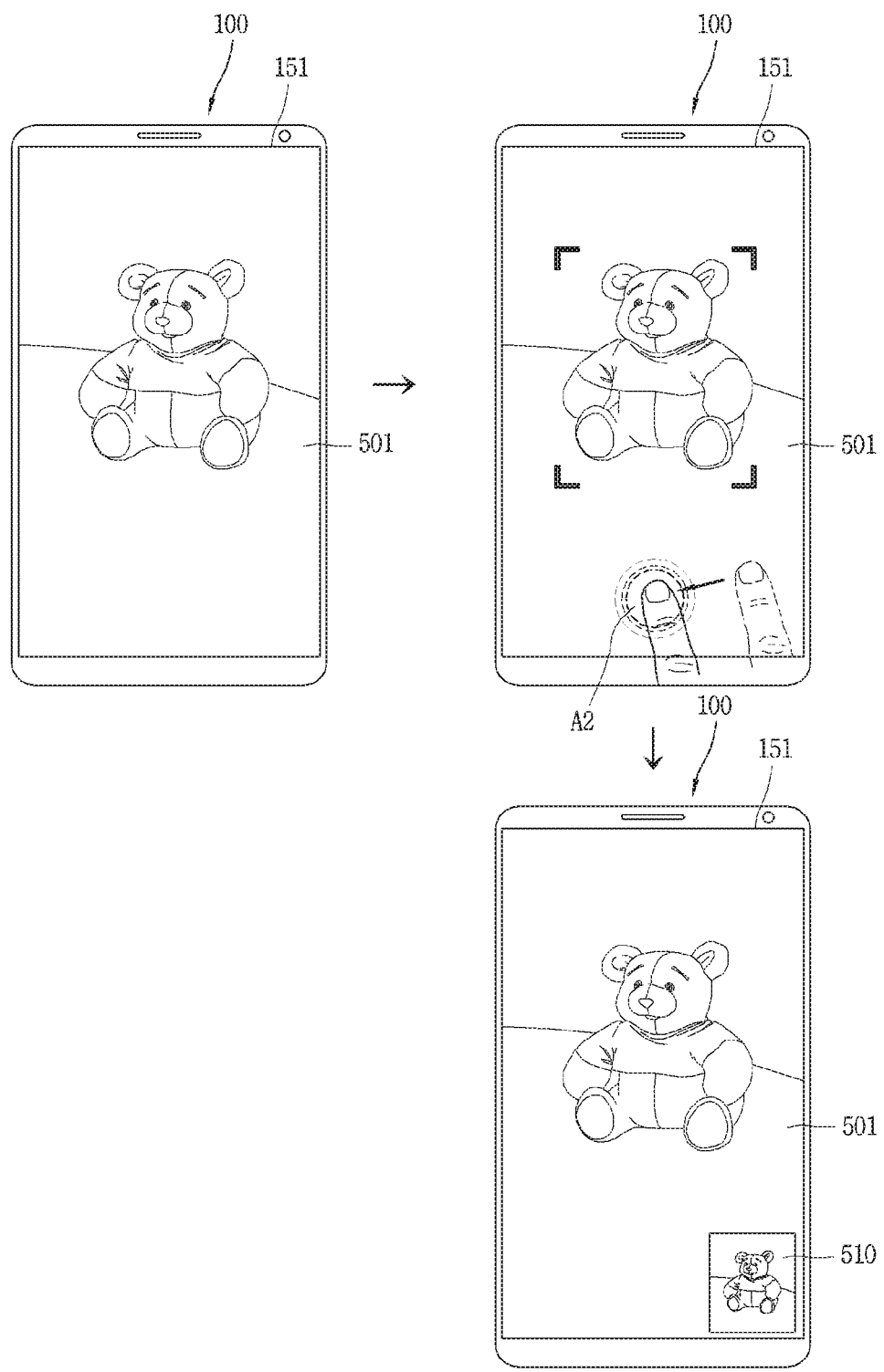
FIG. 7 is a conceptual view for explaining a control method for executing a function of a specific application using a virtual home key unit.

FIG. 7 is a conceptual view for explaining a control method for executing a function of a specific application using a virtual home key unit.

Referring to FIGS. 2A to 4B and FIG. 7, a virtual home key unit according to this embodiment includes a pressure sensor 210, 310 and a vibration output unit 220, 230. A touch pressure applied onto the display unit 151 may be sensed by the pressure sensor 210, 310, and vibrations output by the vibration output unit 220, 230 may be transmitted to one region of the display unit 151 to thus be recognized by a user's finger.

The display unit 151 outputs a preview image 501 acquired by the camera 121. The controller 180 controls the camera 121 to perform a capturing function based on a control command applied onto the display unit 151. However, the display unit 151 does not output a graphic image corresponding to the capturing function.

If coordinates information of a touch input applied onto the display unit 151 corresponds to a first region (A1) closer to a preset specific region or corresponds to the specific region (second region A2), the controller 180 controls the vibration output unit 220, 230 to output a specific vibration pattern.

If a touch input is applied to the second region (A2) and a touch pressure is sensed by the pressure sensor 210, 310, the controller 180 executes a capturing function. Once the capturing function is executed, a captured image is stored, and the display unit 151 outputs a thumbnail image 510 of the stored image.

That is, the controller 180 performs a function based on a pressure touch applied to a preset specific position, without outputting an icon or a graphic image to the display unit 151. Thus, as the display unit 151 needs not output a graphic image, an icon, or the like, for executing a function, a user may check an entire preview image not blocked by the graphic image (or the icon).

Figure 8A:
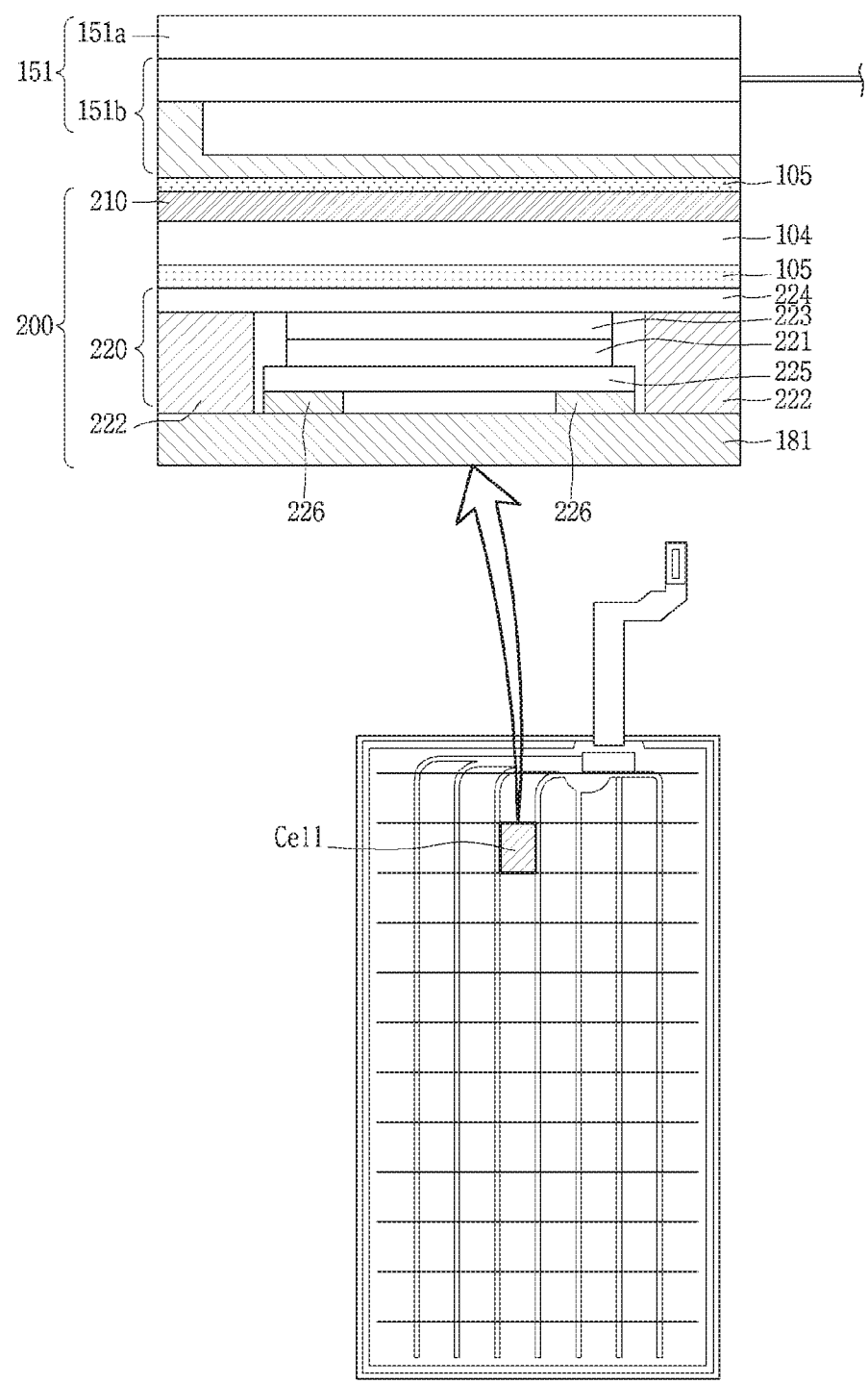
FIGS. 8A to 8C are conceptual views for explaining a method for controlling a mobile terminal according to another embodiment of the present invention.
Figure 8B:
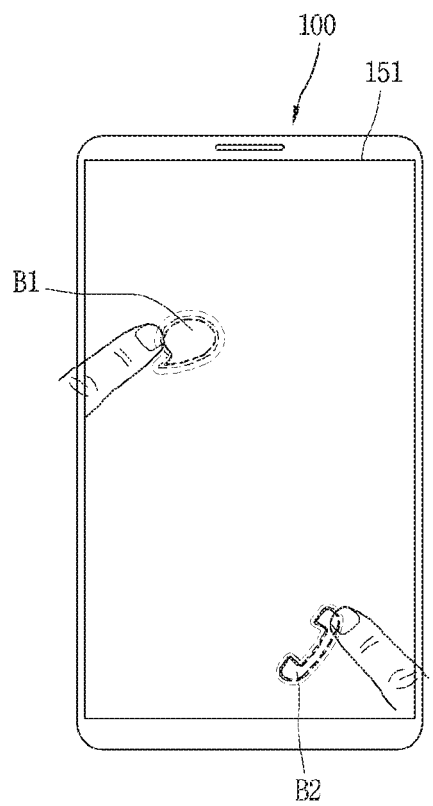
Figure 8C:
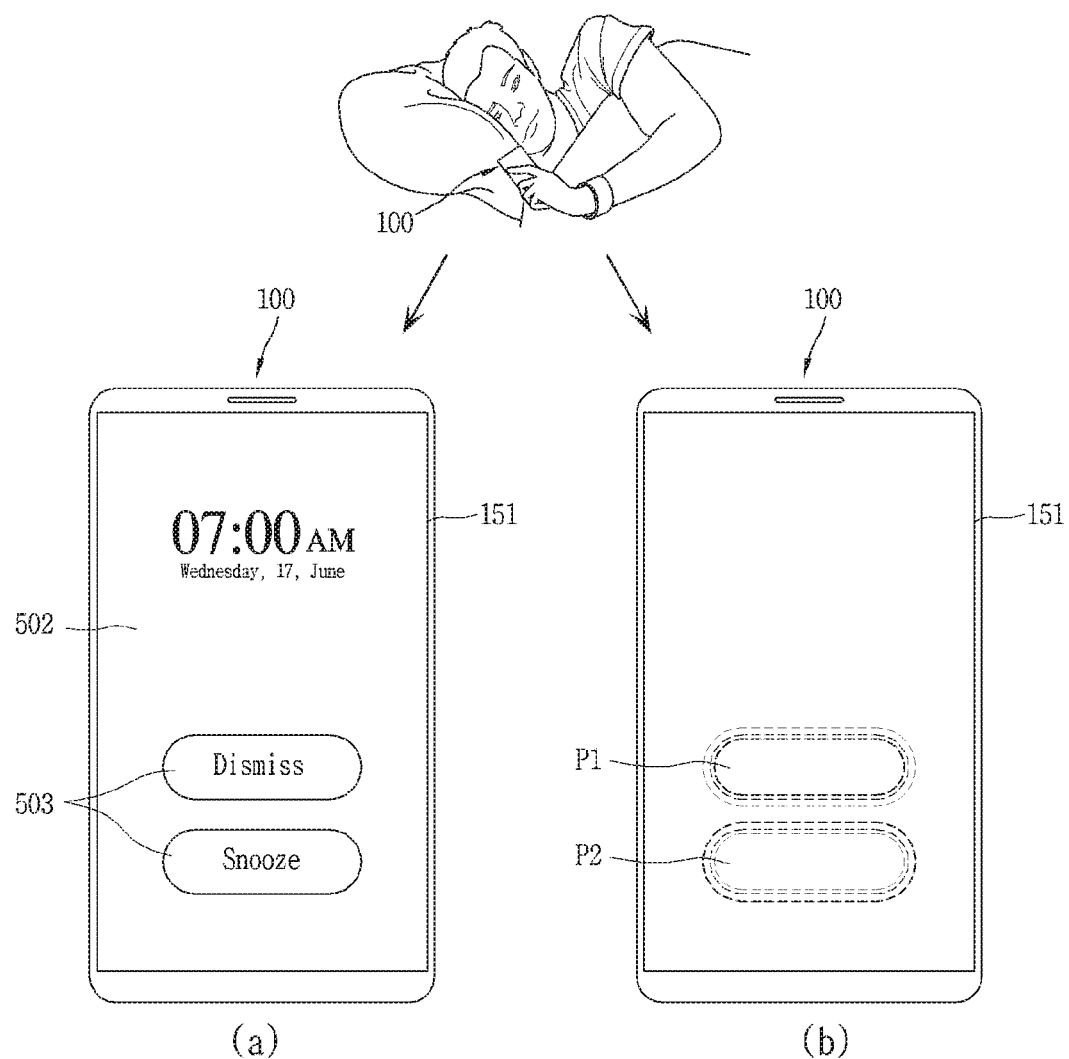

FIGS. 8A to 8C are conceptual views for explaining a method for controlling a mobile terminal according to another embodiment of the present invention.

Referring to FIG. 8A, the mobile terminal according to this embodiment includes a plurality of virtual home key units 200 overlapped with an entire region of the display unit 151.

The controller 180 activates a part of the plurality of virtual home key units 200. The plurality of virtual home key units 200 are arranged to be overlapped with a plurality of cells of the display unit 151. In this embodiment, vibrations may be output from all regions of the display unit 151, and a touch pressure may be sensed.

Referring to FIG. 8B, if a touch input is sensed on a specific region of the display unit 151 corresponding to a specific function, the controller 180 controls the vibration output unit 220, 230 to output vibrations. If a user's touch input is sensed on the specific region and a touch pressure is sensed by the pressure sensor 210, 310 corresponding to the specific region, the controller 180 executes the specific function.

For instance, when an event occurs, the event may correspond to a different region according to its type. A message reception event may correspond to a first notification region (B1), and a notification indicating a missed call may correspond to a second notification region (B2). The controller may control vibrations to be output and a touch pressure to be sensed, by activating the virtual home key unit 200 corresponding to at least one of the first and second notification regions (B1, B2).

If a touch input is applied to the first and second notification regions (B1, B2) or a peripheral region, the controller 180 controls the vibration output unit 220, 320 to output vibrations. The vibration output units 220, 320 may output vibrations of different patterns according to different events. A pattern including a vibration range and a pause time as well as an amplitude and a frequency of vibrations, may be differently set.

Thus, when a touch input is applied to a region corresponding to each event and vibrations are sensed, a user may output event-related information or execute an event-related application through a pressure touch.

In the drawings, it is illustrated that vibrations are output in an output state of no image to the display unit 151. However, the control method according to this embodiment may be equally applied even in an output state of specific screen information, as well as in a deactivated state of the display unit 151.

Thus, the controller may perform a function based on a user's tactile state, without additionally outputting a graphic image for executing an event or a specific function.

FIG. 8C is a conceptual view for explaining a control method for executing a function according to another embodiment of the present invention.

Referring to FIG. 8C, when a specific application is executed or an event occurs, the controller 180 outputs a graphic image to receive a touch input, or outputs a vibration pattern to receive a pressure touch, for control.

Referring to FIG. 8C(a), when the specific application is executed or when an event occurs, the controller 180 activates the display unit 151 and outputs screen information 502. The screen information 502 may correspond to screen information of a default image or a locked state, or may correspond to an execution screen of an application related to a specific function or an event.

The display unit 151 outputs at least one graphic image 503 which receives a touch input in order to control the specific function or the event. The controller 180 controls a function based on a touch input applied to the graphic image 503.

Referring to FIG. 8C(b), when the specific application is executed or when an event occurs, the controller 180 senses a touch input without activating the display unit 151.

The controller 180 controls the vibration output unit 220, 320 to output vibrations of a specific pattern, based on the touch input. The controller 180 outputs first and second vibration patterns (P1, P2) to different regions for forming different control commands. For instance, when an alarm rings, first and second regions are set to receive pressure touches for dismissing and snoozing, and first and second vibration patterns (P1, P2) different from each other are output to the first and second regions. The first and second vibration patterns (P1, P2) may be output based on a touch input applied onto the display unit (a touch input including touch coordinates adjacent to the first and second regions), or may be output based on the specific function and the event.

A user may sense the first and second vibration patterns (P1, P2), and may control a function by applying a pressure touch to a region corresponding to a desired function.

In this embodiment, a user may perform a desired function only in a tactile manner, without viewing the display unit 151.

Figure 9A:
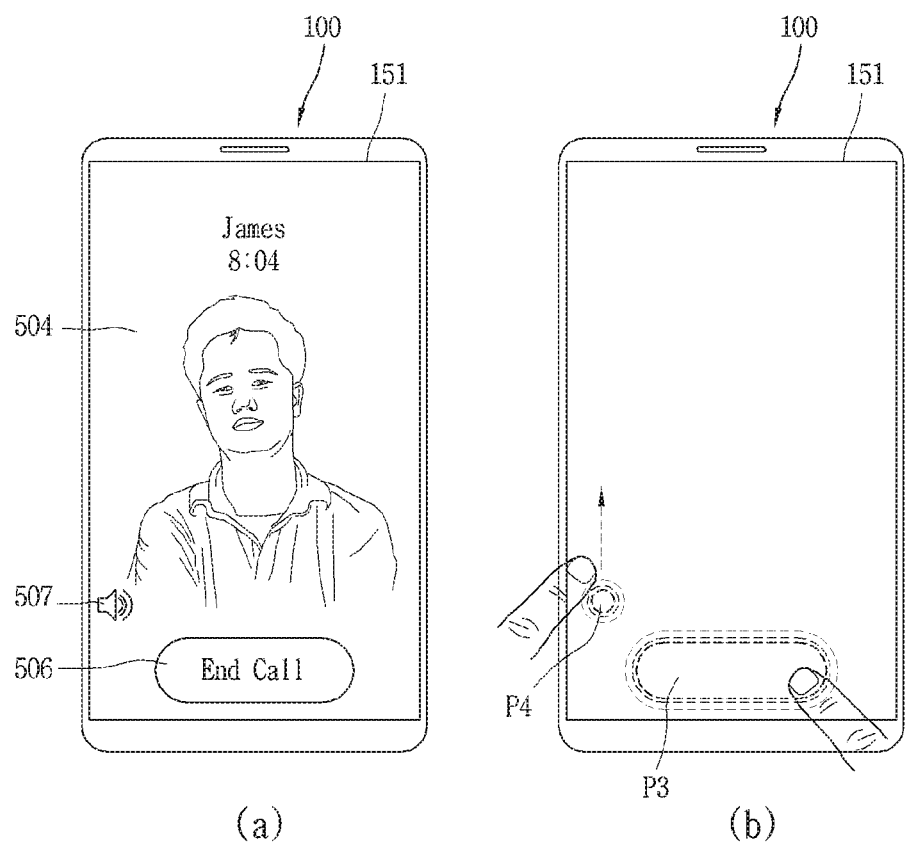
FIGS. 9A and 9B are conceptual views for explaining a control method using a virtual home key unit.
Figure 9B:
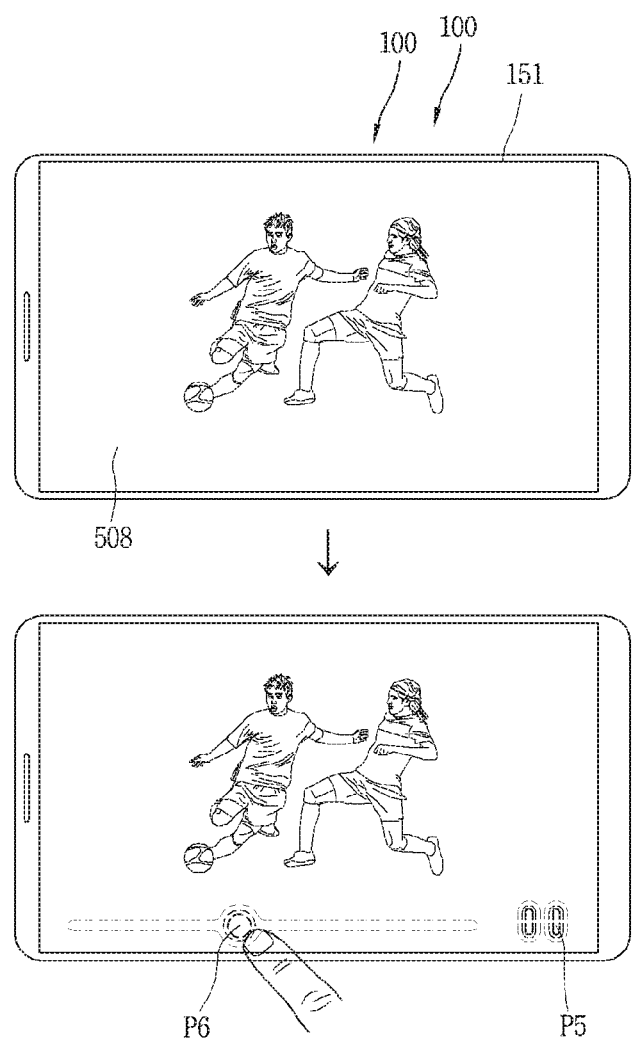

FIGS. 9A and 9B are conceptual views for explaining a control method using a virtual home key unit according to the present invention.

Referring to FIG. 9A, when an event occurs, the controller 180 may output a graphic image for controlling an application corresponding to the event, or may output a vibration pattern to an output region of the graphic image. The output region of the graphic image or the vibration pattern may be the same in case of the same function, or may be plural.

Referring to FIG. 9A(a), when a call is connected, the display unit 151 is activated to output a call connection screen 504. And the display unit 151 outputs, to the call connection screen 504, a first graphic image 506 for controlling a first function and a second graphic image 507 for controlling a second function. For instance, the first function corresponds to disconnecting the call, and the second function corresponds to a volume control function.

Referring to FIG. 9A(b), the display unit 151 does not output screen information, but outputs third and fourth vibration patterns (P3, P4) to different regions based on a touch input applied to the display unit 151.

The output regions of the third and fourth vibration patterns (P3, P4) may be substantially the same as the output regions of the first and second graphic images 506, 507 in FIG. 9A(a).

The controller 180 may perform the first or second function based on a pressure touch applied while the third and fourth vibration patterns (P3, P4) are being output.

In order to control a volume of a sound, a touch input applied to the second graphic image 507 corresponds to a continuous touch input. A volume of a sound is controlled based on a continuous touch input which moves after a pressure touch is applied to a region of the fourth vibration pattern (P4).

Thus, a user may control a function during a call without viewing the display unit 151.

Referring to FIG. 9B, the display unit 151 outputs a play screen 508 for video. A graphic image for controlling a play function is not output to the play screen 508 for video.

The controller 180 controls the vibration output unit 220, 320 to output at least one of fifth and sixth vibration patterns (P5, P6) to different regions, based on a touch input applied to one region of the play screen 508. In this case, a graphic image which blocks the play screen 508 is not output to the play screen 508, either.

The controller 180 may control a corresponding function by applying a pressure touch to the display unit 151 where the fifth and sixth vibration patterns (P5, P6) are output. For instance, a play time of a video may be changed, playing and stopping may be controlled, or a volume may be controlled.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the electronic device. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

INDUSTRIAL APPLICABILITY

The present invention provides a mobile terminal which outputs vibrations based on a touch input applied to a display unit. The mobile terminal may be utilizable in various industrial fields.

The invention claimed is:
1. A mobile terminal, comprising:
a display configured to display an image;
a touch sensor included in the display and having one or more regions maintained in an active state while the display is in a deactivated state;
a key unit located to overlap a specific region of the display, wherein the specific region includes a button region which is less than an entire portion of the specific region, wherein the key unit provides an output for executing a specific function, wherein the key unit includes:
a vibration unit configured to provide vibration of a specific pattern; and
a pressure sensor located between the vibration unit and the display, wherein the pressure sensor is configured to sense touch pressure of the touch input when activated; and
a controller configured to:
activate the vibration unit to provide the vibration of the specific pattern, and activate the pressure sensor to permit the pressure sensor to sense the touch pressure of the touch input, when the touch sensor senses the touch input as being received at a position that corresponds to being within the button region of the display;
not activate the pressure sensor, when the touch sensor senses the touch input as being received at a position that does not correspond to being within the button region of the display; and
execute the specific function when the touch pressure of the touch input is sensed by the activated pressure sensor while the display is in the deactivated state, wherein the specific function includes causing the display to display specific screen information.

2. The mobile terminal of claim 1, wherein the vibration unit is further configured to provide vibrations of different patterns according to whether the touch input is received at a position that corresponds to the button region of the display or at an area that is peripheral to the button region, and wherein the button region is a virtual home key.

3. The mobile terminal of claim 2, wherein the controller is further configured to control the vibration unit to provide vibrations having relatively greater frequency as the touch input approaches the button region from the area that is peripheral to the button region.

4. The mobile terminal of claim 1, wherein the key unit includes a first case and a second case which form a space sized to accommodate the pressure sensor and the vibration unit, and wherein the vibration unit includes a flexible printed circuit board, and a piezo layer transformed by a supplied voltage.

5. The mobile terminal of claim 4, wherein the pressure sensor includes two members which form a separating space, and wherein the piezo layer is located at the separating space.

6. The mobile terminal of claim 5, wherein the first case includes a plurality of holes formed at regions which overlap the piezo layer.

7. The mobile terminal of claim 1, wherein the controller is further configured to:

cause the display to display screen information of an application; and control a function of the application based on a pressure touch applied to a region that overlaps with one region of the screen information.

8. The mobile terminal of claim 1, wherein the key unit includes a plurality of modules overlapping an entire region of the display.

9. The mobile terminal of claim 8, wherein the controller is further configured to:

activate a module, from among the plurality of modules, corresponding to a preset region of a displayed location of an application that is being executed.

10. A method for controlling a mobile terminal having a display, vibration unit, touch sensor and pressure sensor, the method comprising:

maintaining one or more regions of the touch sensor in an active state while the display is in a deactivated state sensing, via the touch sensor, a touch input received at the display, wherein the display includes a specific region, and wherein the specific region includes a button region that is less than an entire portion of the specific region;

activating the vibration unit to provide vibration of a specific pattern, and activating the pressure sensor to permit the pressure sensor to sense touch pressure of the touch input, when the touch sensor senses the touch input as being received at a position that correspond to being within a button region of the display;

not activating the pressure sensor, when the touch sensor senses the touch input as being received at a position that does not correspond to being within the button region of the display; and executing a specific function when the touch pressure of the touch input is sensed by the activated pressure sensor while the display is in the deactivated state, wherein the specific function includes causing the display to display specific screen information.

11. The method of claim 10, further comprising:

measuring a time duration from a time when the sensed touch pressure exceeds a reference pressure to a time when the sensed touch pressure is less than or equal to the reference pressure;

comparing the measured time duration with a reference time;

generating a first control command when the measured time duration is greater than the reference time; and generating a second control command when the measured time duration is less than or equal to the reference time.

12. The mobile terminal of claim 1, wherein the controller is further configured to:

determine a first time when the touch pressure is larger than a reference pressure;

determine a time duration from the first time to a second time when the touch pressure becomes smaller than or equal to the reference pressure;

compare a pressure touch application time corresponding to the time duration with a reference time to determine whether the touch pressure is a general touch input or a long touch input;

form a first control command, if the touch pressure sensed by the pressure sensor is the general touch input;

form a second control command if the touch pressure is the long touch input; and control respectively different functions to be performed based on the first control command or the second control command.

13. The mobile terminal of claim 1, wherein the display is further configured display to a first notification region for executing a first application related to a first event and a second notification region a second application related to a second event, and the controller is further configured to control vibrations to be output and a touch pressure to be sensed, by activating the key unit corresponding to at least one of the first and second notification regions when the first or second event has occurred.

14. The mobile terminal of claim 13, wherein the vibration unit includes a piezo layer transformed by a supplied voltage, wherein the vibration unit is located between an inner frame which supports the pressure sensor, and a main printed circuit board, and wherein the vibration unit further includes spacers spaced from each other, wherein the piezo layer is located between the spacers, and wherein the spacers are located between the inner frame and the main printed circuit board.

15. The mobile terminal of claim 14, wherein the key unit further includes an actuator supporting the pressure sensor, and wherein the actuator includes a supporting portion for supporting the pressure sensor, and an attachment portion extending from the supporting portion and fixed to the display.

16. The mobile terminal of claim 15, wherein one surface of the supporting portion is convex.

* * * * *